United States Patent [19]

Kline et al.

[11] 4,456,788

[45] Jun. 26, 1984

[54] TELECOMMUNICATION TRUNK CIRCUIT REPORTER AND ADVISOR

[75] Inventors: Samuel J. Kline, Sherborn; Richard E. Little, Dedham, both of Mass.

[73] Assignee: GTE Business Communication Systems Inc., Waltham, Mass.

[21] Appl. No.: 445,863

[22] Filed: Dec. 1, 1982

[51] Int. Cl.³ .............................................. H04M 3/36
[52] U.S. Cl. ........................... 179/7.1 R; 179/18 AG; 179/18 C
[58] Field of Search ................ 119/7.1 R, 8 A, 9, 11, 119/18 AG, 18 C, 7.1 TP, 7 R, 7 MM, 18 BA, 27 D

[56] References Cited

U.S. PATENT DOCUMENTS 4,200,771 4/1980 Kraushaar .................... 179/7.1 R X Primary Examiner—Stafford D. Schreyer
Attorney, Agent, or Firm—J. Stephen Yeo

[57] ABSTRACT

A telecommunication network includes a number of switches interconnected by groups of trunk circuits. Trunk traffic data is generated by the switches and transmitted to a network control center where it is stored in a traffic database. The network control center includes a system for mechanically generating periodic traffic reports and performing calculations leading to recommendations pertaining to additions or deletions of the number of trunks in a group necessary to maintain an optimum size network.

3 Claims, 19 Drawing Figures

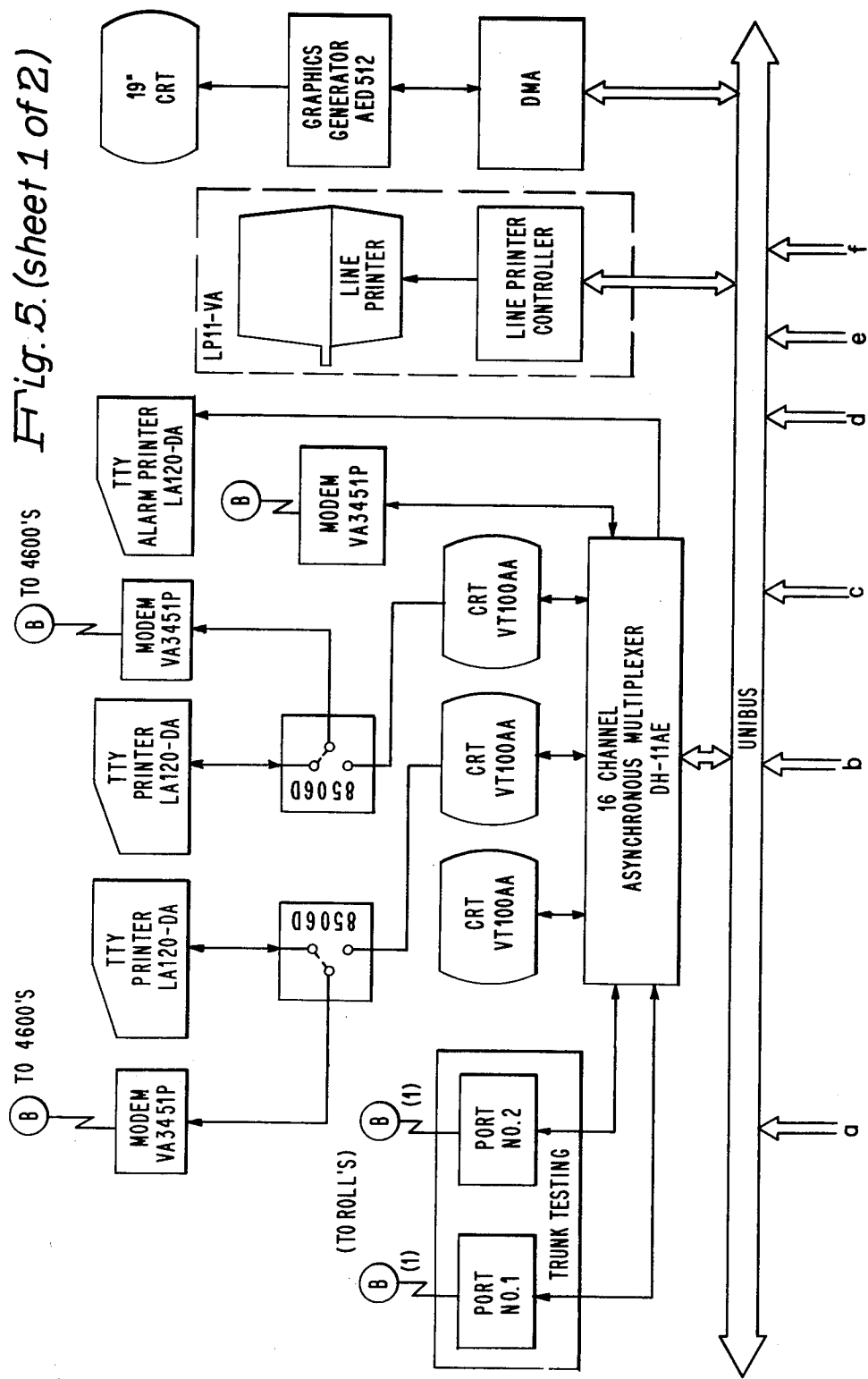
Fig. 5 (sheet 1 of 2)

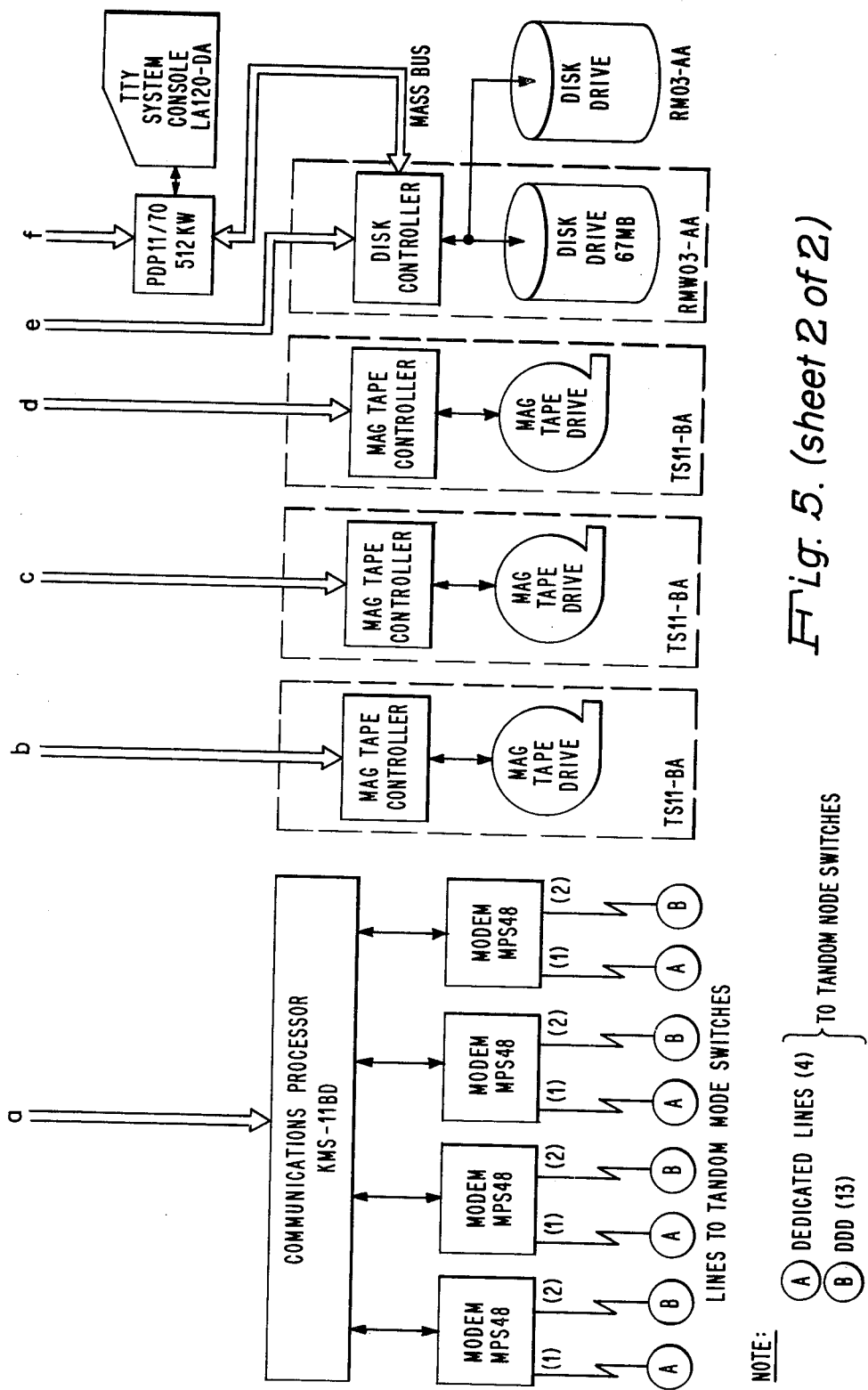
Fig. 5. (sheet 2 of 2)

NOTES:
1. COLOR REFERS TO GRAPHICS DISPLAY SYMBOL
2. ACKNOWLEDGEMENT WILL RETIRE ALL UNACKNOWLEDGED ALERTS FROM A GIVEN SOURCE

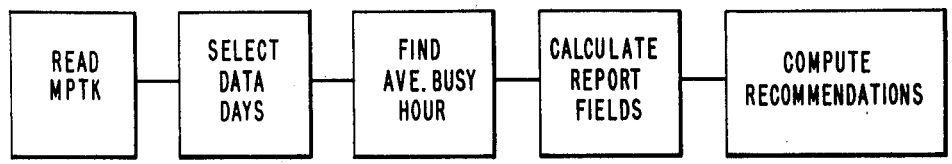

Fig. 16.

```
1........10........20........30........40..........50........60........70
                                                          TRAFFIC MEASUREMENT S

SWITCH X                 FROM d-mmm-y to d-mmm-y

_____ AVG BUSY HOUR __
  TRK  NUM  AV B   __USAGE__   CAR'D  OFR'D  -OUTGOING--   AVG   _____
  GRP  TKS  HOUR   INC   OUT   LOAD   LOAD   ATMPS  OVFL   BLKG  ATMPS  OVFL

XXXX XXX  XXXX   XXXXX XXXXX XXXXX  XXXXX  XXXXX  XXXXX  XXXXX XXXXX  XXXXX
   .    .    .      .     .     .      .      .      .      .     .      .
   .    .    .      .     .     .      .      .      .      .     .      .
   .    .    .      .     .     .      .      .      .      .     .      .
```

SUMMARY REPORT                                                  d-mmm-y
                                                                PAGE XXX
       _____
       ----QUEUE-----------   BLKG
          ---ABND---          /DLY   --HOURS--    --RCMD--
  USAGE   OH    RB   TMOTS    DLY  TRGT  ABOVE TRGT  ADD/RMV   EQN
                                        -2M -1M  CM  -2M -1M CM XXXXX  XXXXX XXXXX XXXXX  XXXXX  XXXX  XX  XX  XX  XX  XX XX  X
    .     .     .     .      .      .    .   .   .   .   .  .   .
    .     .     .     .      .      .    .   .   .   .   .  .   .
    .     .     .     .      .      .    .   .   .   .   .  .   .
```

Fig. 17b.

TELECOMMUNICATION TRUNK CIRCUIT REPORTER AND ADVISOR

FIELD OF THE INVENTION

This invention is concerned with telecommunication networks and, more particularly, is concerned with control centers for such networks.

CROSS REFERENCE TO RELATED APPLICATIONS

Co-pending U.S. patent application Ser. No. 439,470, filed Nov. 5, 1982, for "Private Interconnect Network" is directed towards a tandem switching network.

The following co-pending U.S. patent applications pertain to other features of a network control center.

Ser. No. 446,072, filed Dec. 1, 1982 herewith in the name of Jonas R. Bielkevicius, entitled "Network Control Center Alarm Message Detector".

Ser. No. 445,867, filed Dec. 1, 1982 herewith in the name of Richard E. Little, entitled "Telecommunication Network Display System".

Ser. No. 445,866, filed Dec. 1, 1982 herewith in the names of Samuel J. Kline and Richard E. Little, entitled "Network Control Center Call Trace".

Ser. No. 445,868, filed Dec. 1, 1982 concurrently herewith in the name of Samuel J. Kline, entitled "Network Control Center Trouble Ticket".

Ser. No. 445,861, filed Dec. 1, 1982 herewith in the name of Richard E. Little, entitled "Internodal Conference Call Administrator".

REFERENCE TO RELATED PUBLICATIONS

A detailed description of the GTD-4600 exchange referred to herein will be found in a paper entitled "Evolution of the GTD-4600 PABX Tandem Switching System" given at the National Telecommunications Conference in New Orleans on Dec. 3, 1981. The last portion of this paper provides a list of additional published references concerning the GTD-4600.

The telecommunication network described herein is described in more detail in a paper given at the same conference and on the same date given above and entitled "Private Interconnect Networks Overview".

The network control center disclosed herein is described in another paper entitled "Network Control Center" and given at the same conference and on the same date given above.

Additional papers describing the network control center and the connections between the exchanges and the center have been published in the *GTE Automatic Electric World Wide Communications Journal*, January-February 1982. Titles of these papers are as follows: "Network Control Center Interface for the GTD-4600 Tandem Switch Enhancement" and "GTD-4600 Tandem Switching and Feature Enhancements".

The contents of all of these papers and the list of references identified above are incorporated by reference herein.

BACKGROUND OF THE INVENTION

Medium to large corporations and governmental agencies may have a number of locations scattered across the country. The amount of voice and data information to be rapidly transferred between locations is increasing each year. This increase in transferred information coupled with increased rates charged by common carriers has caused many users to purchase or lease private telecommunication networks. These networks may include network control centers which provide important network administration, control, and maintenance functions.

SUMMARY OF THE INVENTION

In one aspect of the invention, a telecommunication network has a plurality of tandem node switches interconnected by groups of trunks. Each switch generates trunk group management data which is transmitted to a network control center system where the data is stored and read. Days for which the average usage of a selected set of trunk groups exceeds a specified level are identified as data days.

The system determines the average busy hour and the average offered load. The system then calculates the amount of busy hour average blocking. The amount of trunks to be added to or deleted from a trunk is calculated for the condition where the actual busy hour blocking is approximately the same as a target busy hour average blocking.

BRIEF DESCRIPTION OF THE DRAWINGS

In the drawings:

FIGS. 5-1 and 5-2 are a more detailed diagram of the NCC;

FIG. 7 shows an arrangement for storing and reporting message detail records at the NCC;

FIG. 16 is an information flow diagram of the traffic analysis feature; and

FIGS. 17a and 17b are an example of a traffic management report format.

For a better understanding of the present invention, together with other and further objects, advantages and capabilities thereof, reference is made to the following disclosure and appended claims in connection with the above-described drawings.

DESCRIPTION OF THE INVENTION

I. Overview of Network

Figure 1:
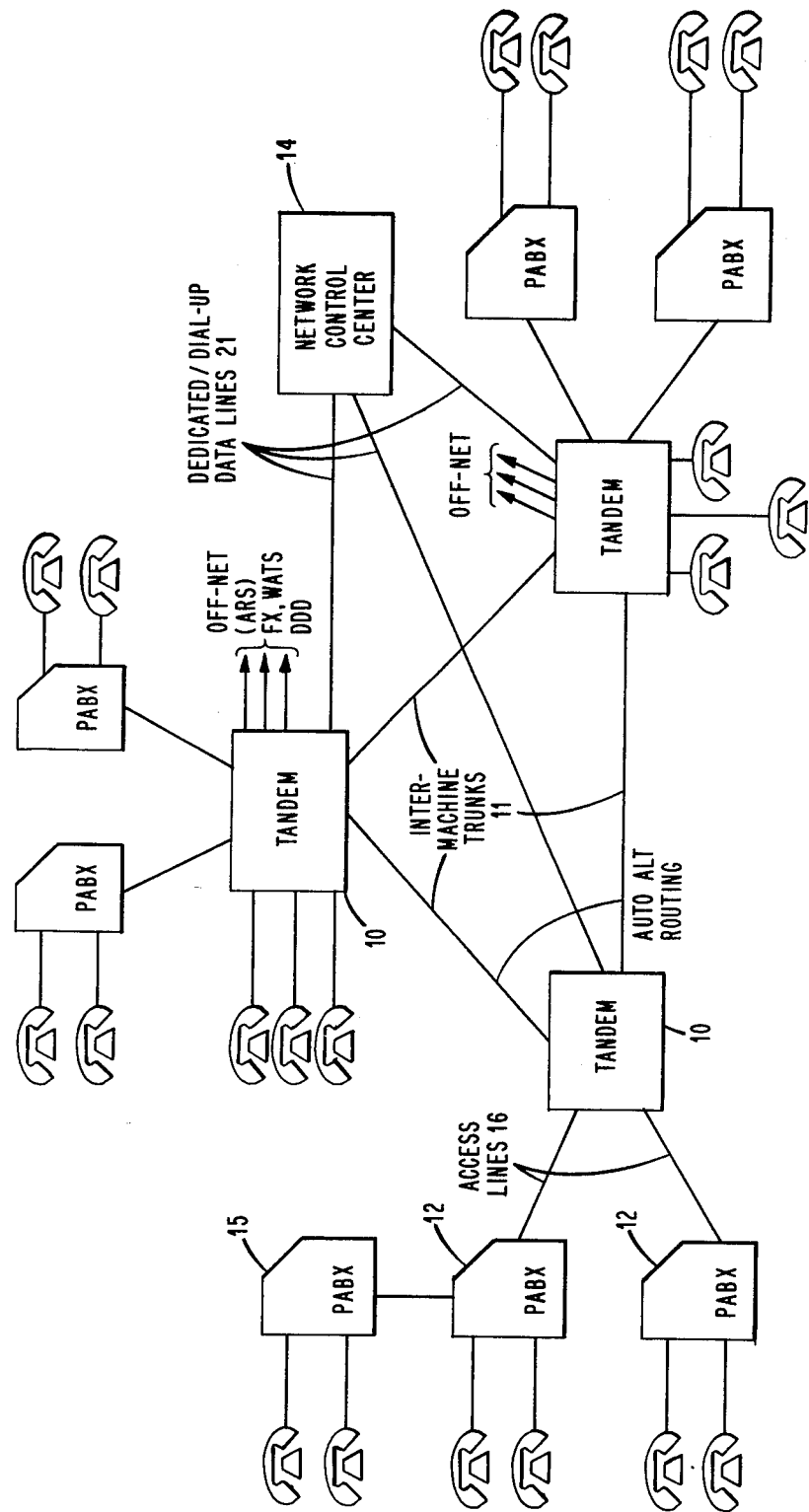
FIG. 1 is a block diagram of a tandem node telecommunication network including a network control center (NCC)

FIG. 1 shows an example of a private telecommunication network configuration. Several tandem node switches 10 serve as traffic concentrators and are used to direct traffic through the network. The tandem node switches are interconnected by intermachine trunks 11. These tandem node switches are generally located at the customer's major locations and may also provide private automatic branch exchange (PABX) capability. Since the tandem node switch generally provides major tandem capability and serves the stations at major locations, these switches must have a capacity to serve thousands of stations and hundreds of trunks (intermachine, access lines, and off-net). Satellite PABXs 12 are homed to one or more tandem node switches by access lines 13. Traffic to locations not served by the network is called off-net traffic and is served by common carriers on the public networks.

The private network configuration also includes a centralized network control center (NCC) 14, which provides network administration, control, and maintenance functions.

Each tandem node switch 10 may serve a large geographical area. The access lines 13, the intermachine trunks 11 and off-net facilities are leased from common carriers. Mixtures of satellite and terrestrial circuits are available.

One such tandem node switch is the GTD-4600-TSE manufactured and sold by GTE Corporation. This switch can function as a large PABX utilizing a digital network as well as function as a tandem node in a private interconnect telecommunication network. The tandem node switch can be configured to have one or more customer groups as mains. These mains can be stand-alone switches or can have subtending satellite PABXs 12 or tributary PABXs 15. Each main can also have any or all of the features of a tandem node switch and may or may not be part of the network served by the tandem node customer group.

The network can process both private and public dialing. In the case of public dialing, a route will be established through the network to the closest location to the dialed number and the call dropped off the private network to the public network at that point.

The network dialing plan consists of a seven digit code. The first three digits are a unique RNX code which determines the location of the main within the network. The remaining four digits are the station number of the party dialed and correspond to his extension number or the listed number of the PABX. Within a main/sat/trib complex, each satellite and/or tributary can have a unique RNX code or may have the same RNX code as the main. If an entire main/sat/trib complex has the same RNX code, then the four digit station number or the listed number must be unique within that main/sat/trib complex.

The tandem node switch also processes on-network ten digit calls. Based on the area and office codes dialed, the closest tandem node will be selected by a translator and a route established through the network until the last tandem node is reached. The last tandem node will outpulse off-net either seven or ten digits, depending upon the NPA area.

In addition to network routing and translation functions of a tandem node switch, it has network control features which dynamically control the routing and translation, and for providing information on the level and type of traffic through the switch. These controls can be activated via either the network control center (NCC) or a designated local control terminal at each switch. Features such as trunk direction, dynamic route, time-of-day override and code blocking are all used to dynamically alter the routing and translation capabilities of the tandem node switch. Short register timing changes the holding time for receivers while station message detail recording (MDR), traffic data recording and 100 second trunk data provide periodic messages to the NCC for use in determining traffic data.

Centralized administration and maintenance is accomplished by providing the tandem node switch with a high speed data-link interface to the network control center (NCC) 14. The data-link interface provides transmission and processing of such data as 100 second update of trunk data, traffic data, message detail recording (MDR), as well as the other maintenance and administration information previously provided locally. There is a need to send considerable amounts of full period data, the transmission of which requires framing, error checking, retransmission for error conditions, and a number of other communications tasks which require the tandem node switch to include a network control interface (NCI) which includes software and a communications front end 17 seen in FIG. 2.

The NCI provides the centralized administration and maintenance features associated with interfacing the corresponding tandem node switch with the network control center.

The NCI is structured around standard data communications protocol levels. A modem interface (level 1) was chosen as EIA RS232C. The transmission protocol (level 2) is a subset of HDLC/SDLC (the X.25 transmission level 2 protocol). Since full period point-to-point circuits are required, a data switching level is not used. Therefore, the next level is an application dependent protocol established between the tandem node switch and the NCC. This level is implemented entirely in software and runs on the communications front end (CFE) 17.

Figure 2:
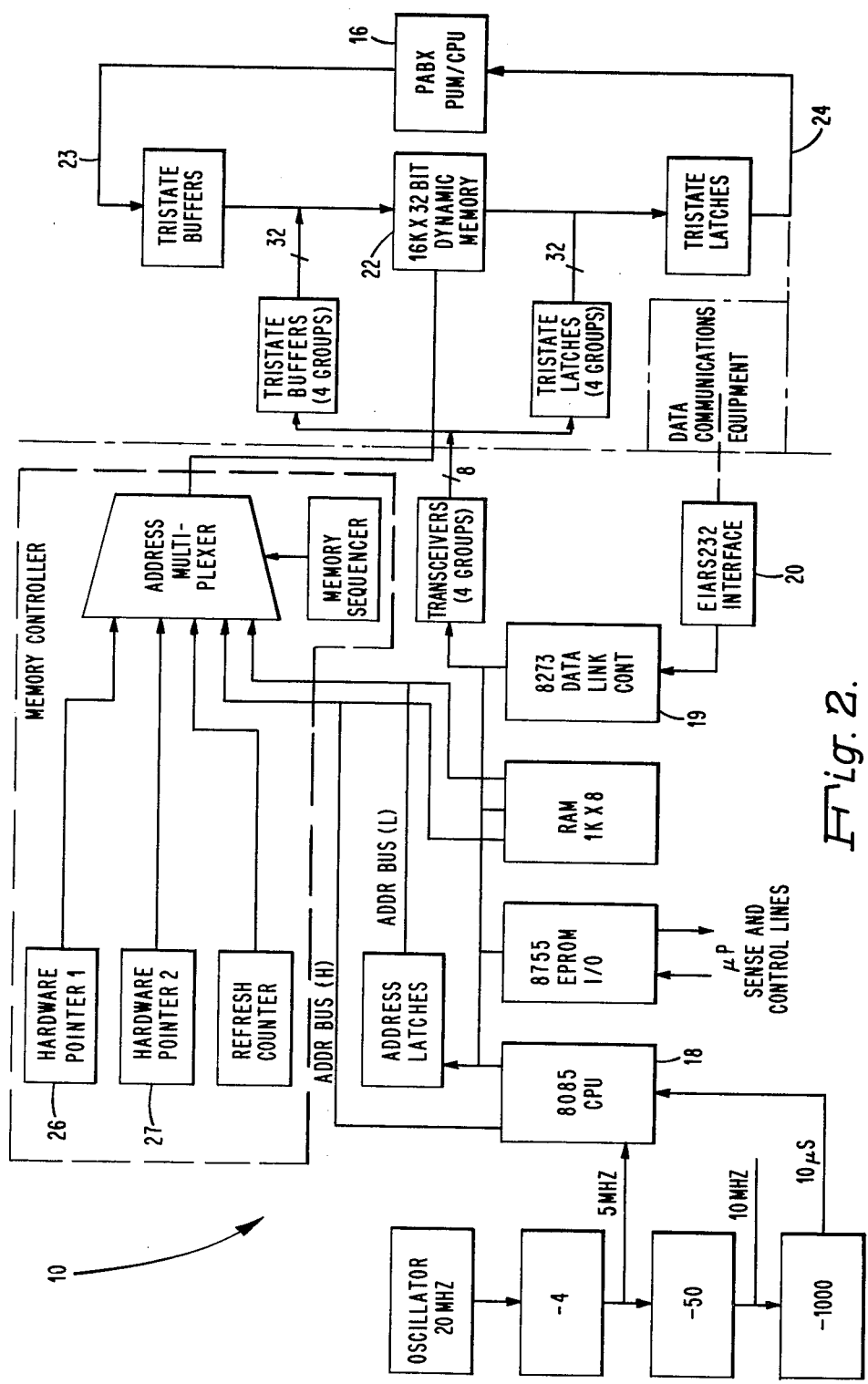
FIG. 2 is a block diagram of a circuit for interfacing a tandem node switch with the NCC.

A brief overview of the GTD-4600-TSE hardware as seen in FIG. 2 should serve to better understand the network control interface (NCI). The GTD-4600-TSE 10 is a central processor based PABX with tandem switch enhancement which utilizes a general purpose sense and control structure termed the peripheral unit matrix (PUM) 16 to address the peripheral hardware. The entire complex is duplex for high reliability. There are a variety of peripherals associated with the system such as the input/output (I/0) interface, telephony circuit interfaces, and network control interfaces. The switch has a fully duplex digital network.

The network control requirements are partitioned from the primary function of the switch. These requirements, having a major real-time impact, allow the use of distributed processing. This is achieved in hardware by the addition of the communications front end (CFE) 17 as part of the I/0 facilities of the GTD-4600-TSE.

An Intel 8085 controller serves as the main CFE microprocessor 18. An Intel 8273 programmable HDLC/SDLC protocol controller 19 interfaces a data-link modem by means of an EIA RS232C driver and receiver 20.

Figure 3:
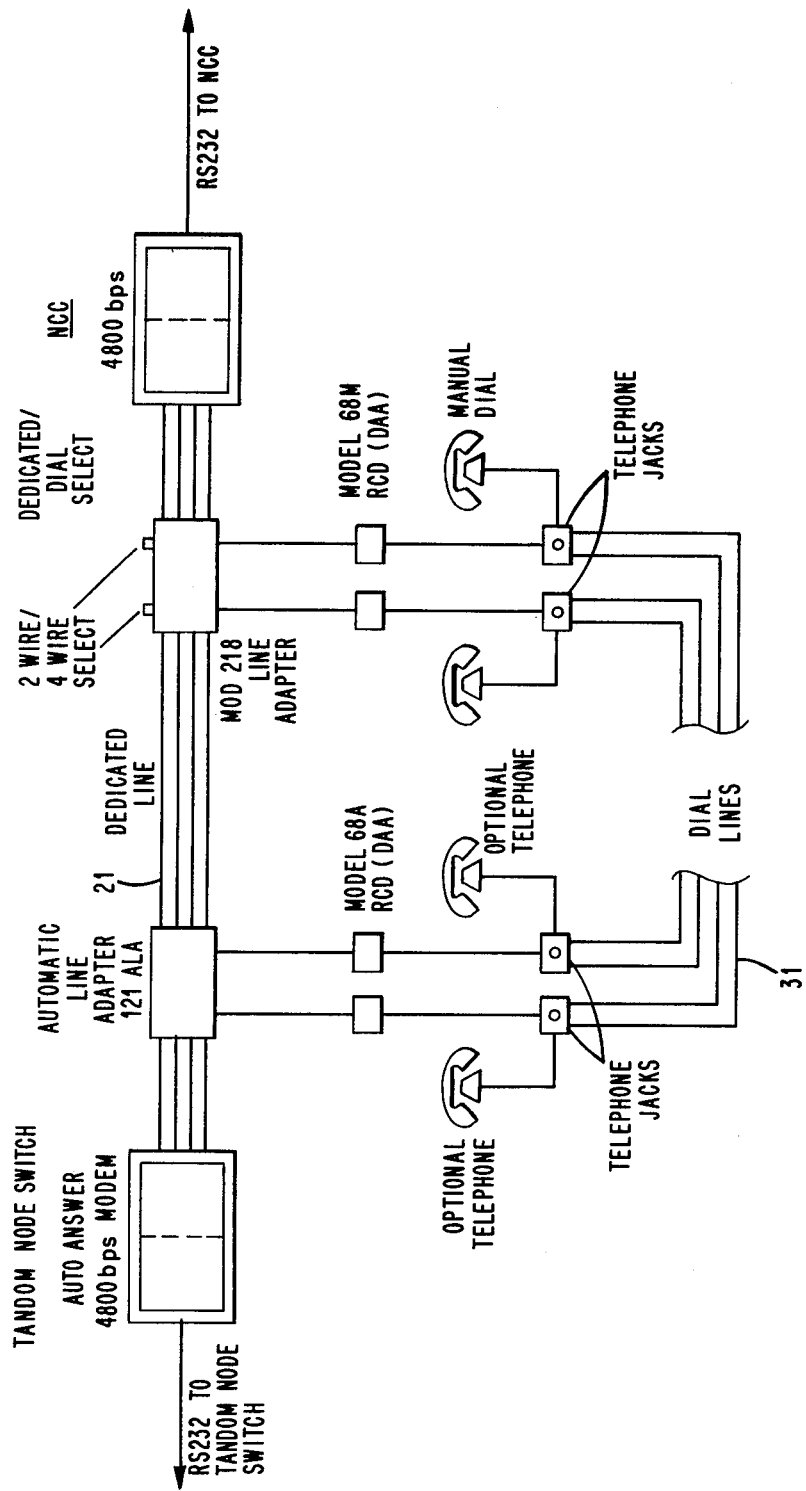
FIG. 3 shows modems and dedicated lines coupling a tandem node switch and the NCC.

The modem configuration between the tandem node switch and the NCC is illustrated by FIG. 3. Communication between the tandem node switch and the NCC is through dedicated 4-wire 4800 b/s data-links 21. The data-link protocol is the International Telephone and Telegraph Consultative Committee (CCITT) specified LAP-B.

Referring again to FIG. 2, a unique 16K by 32 bit "common memory" arrangement 22 is configured to accommodate the 32 bits bus of the GTD-4600 and the 8 bit bus of the CFE microprocessor 18.

The "common memory" functions are to buffer messages received from (or sent to) the data-link, provide program store and provide interprocessor communications between the GTD-4600 central processing unit (CPU) and the CFE microprocessor 18. The system hardware to permits the GTD-4600 to write into the "common memory" via the peripheral control interface (PCI) data bus 23, and read from it via the existing PCI return bus 24. Reading or writing of "common memory" by the GTD-4600 CPU is controlled by two hardware pointers 25, 26 in conjunction with specifically selected peripheral matrix words. Auto-incrementing of the hardware pointers occurs on reads or writes to the peripheral matrix words. This permits the GTD-4600 CPU to automatically write (or read) into (or from) any of eight 2K by 32 pages of consecutive addresses of "common memory". The CFE microprocessor 18 views the same memory as a 64K by 8 RAM within its addressing range and as such, can contain executable code.

II. Overview of Network Control Center

Figure 4:
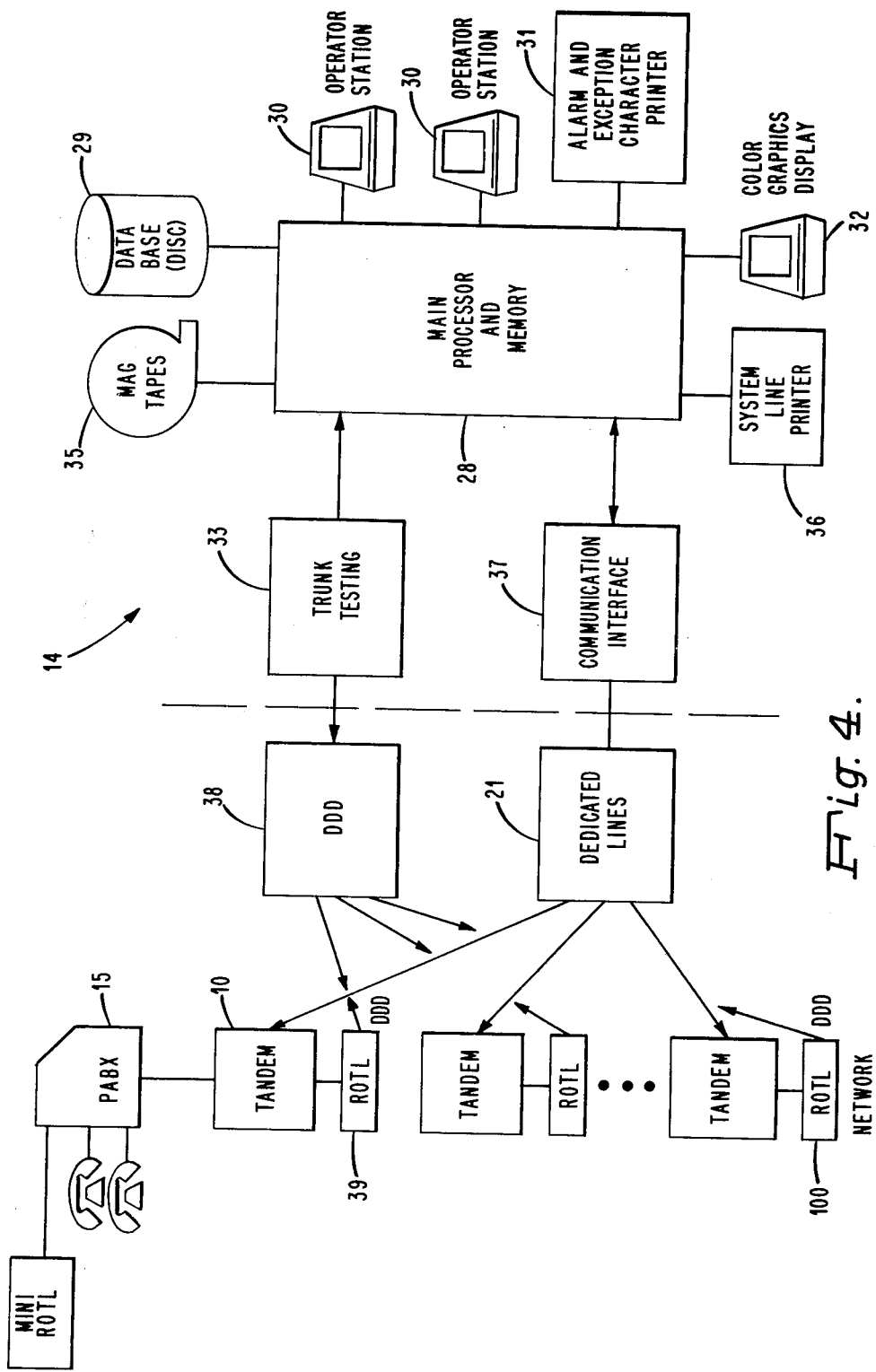
FIG. 4 is a block diagram of the NCC.

FIG. 4 is a block diagram of the physical layout of a network control center (NCC) 14 for practicing the invention. FIG. 5 is a functional block diagram of the NCC.

The network control center is a stand-alone facility, and need not be co-located with a tandem node switch, nor for that matter housed at a location connected into the network. Thus, the network control center may be located to accommodate administrative concerns rather than technical constraints.

Physically, the NCC consists of a main processor and memory 28, disc 29, operator terminals 30, alarm and exception character printer 31, dynamic color graphics display 32, remote trunk testing system 33, magnetic tapes 35, system line printer 36 and data-link communications interface 37.

The main processor and memory 28 is based on a microcomputer such as the Digital Equipment Corporation PDP-11 series of minicomputers and can range from the PDP-11/34 to the PDP-11/70, depending on network characteristics. The main processor, memory, disc and operator terminals accommodate the data manipulation, intermediate storage and human interface necessary to support the central control functions. The color graphics display 32 provides a real-time, global view of network traffic and switch equipment status. The trunk test system 33 consists of software on the NCC computer and communications hardware that transmits control signals via direct distance dialing (DDD) lines 38 to remote office test lines (ROTLs) 39 located at switch sites. The line printer 36 is used to output high-volume reports. A character printer, designated as the "alarm and exception" printer 31, outputs messages of critical importance. The magnetic tapes 35 store message detail record (MDR) data and traffic data for processing on a separate computer facility.

The NCC communicates with the tandem node switches using corresponding dedicated, 4-wire, 4800 b/s data-links 21 as seen in more detail in FIG. 3. The data-link protocol (level 2) is preferably the CCITT specified LAP-B and was chosen for its throughput efficiency, error control and the availability of devices for implementation. This protocol can be enhanced to X.25 to be compatible with public data networks such as that offered by GTE-Telenet Communications Corporation.

In the event of a data-link failure, dial-up lines 34 can fully restore functionality. In the event of catastrophic failure at the NCC, simple hardcopy terminals can be connected to switches via the dial-up lines to continue a degraded monitoring and control operation. Network call processing is in no way hampered by the loss of the NCC. In case of a link or NCC failure, MDR data from the tandem node switches are stored on magnetic tape 42 (FIG. 7) at the tandem node switch site, and can be read back to the NCC when the failure has been corrected.

Figure 6:
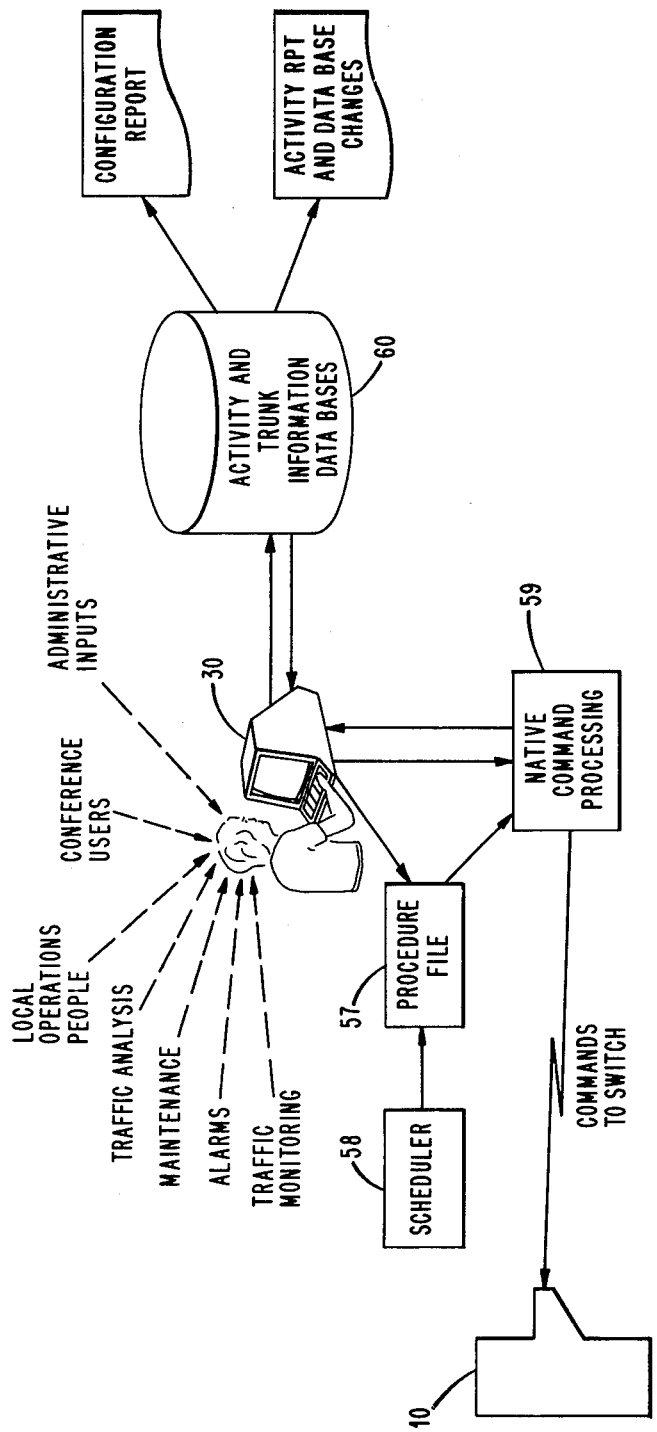
FIG. 6 illustrates the centralized switch control function of the NCC.
Figure 2:
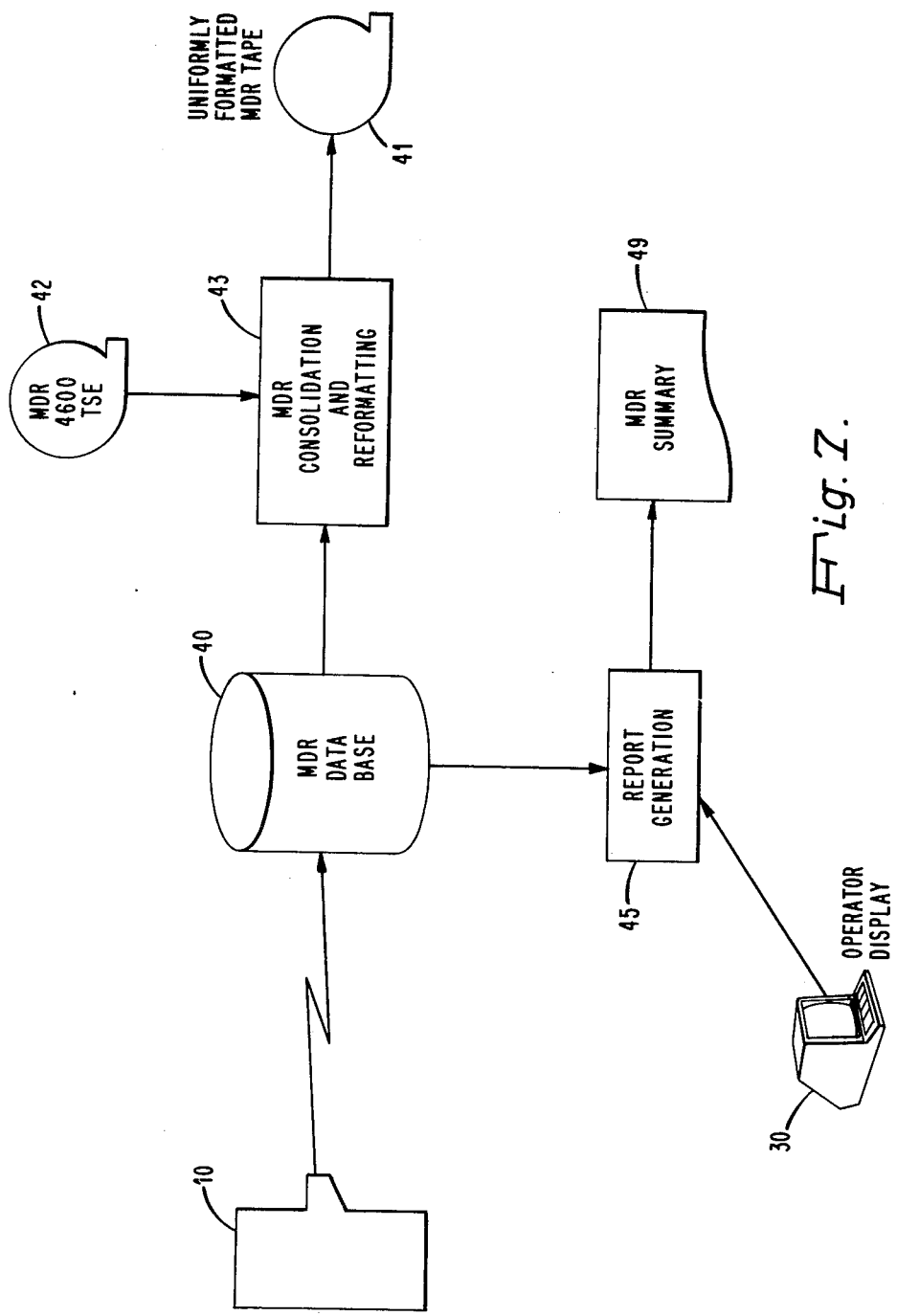

The important NCC capabilities are summarized below: 1. Trunk testing is a tedious manual task and thus often not adequately scheduled. With software and hardware at the NCC, and remote office test lines (ROTLs) at the switches, trunk testing can be scheduled and automatically carried out under NCC control for all inter-machine trunks (IMTs) and satellite PABX access lines. The NCC analyzes the test results and prepares reports showing, for example, which trunks need immediate attention. Trunk testing can also be manually initiated. These capabilities ensure maximum trunk availability and avoid expensive over-dimensioning of network transmission facilities. 2. Switch node maintenance is centralized at the NCC by remoting all tandem node switch craftsperson terminal functions to the NCC. As multiple switches are monitored the volume of maintenance messages and status reports would become overwhelming for manual scanning and, without computerized assistance, important messages would be overlooked. The NCC accepts and stores all switch messages from each network switch, scans them in the process, and alerts the operator immediately when critical messages are detected. Database utility software is provided for later sorting and selective retrieval to make the remaining messages useful. Maintenance costs are reduced and rapid restoral of network service is gained by these capabilities. 3. Network user complaints can provide valuable maintenance information to an NCC operator. The NCC call trace feature provides a capability from an NCC resident database of MDR data to precisely reconstruct the path of any network call. The MDR record format includes identification of incoming and outgoing trunk groups as well as individual circuit identification. Further, other information can be selectively acquired from the MDR database; for example, a specific circuit can be examined for short holding times. These call trace features allow the telecommunication manager to be responsive to user complaints and improve service. 4. Centralized real-time monitoring of network traffic conditions would be virtually impossible without computer assistance. The tandem node switch reports occupancy on each trunk group to the NCC at 100 second intervals. The NCC displays this information using color graphics techniques. When an all-trunks-busy condition persists too long, a threshold report is generated. Such timely information supports effective use of the numerous traffic control features provided by the tandem node switch and controllable from the NCC to mitigate traffic congestion. Optimal service, even during unusual traffic conditions, can be assured. 5. The extensive traffic measurement features of the tandem node switch are designed to accommodate automated centralized traffic data collection at the NCC. The NCC analyzes the traffic data from all nodes in the network, and produces trunk group grade-of-service reports with add/delete-circuits recommendations to meet specified traffic objectives. In addition, traffic data is recorded on magnetic tape for subsequent off-line analysis. These features ensure that the desired grade-of-service is achieved at the lowest transmission costs. 6. By providing for centralized switch database administration, particularly in regard to switch database changes involving network-wide operations or features, the NCC facilitates improved coordination of technical and administrative tasks required for economical, high-quality network operation. FIG. 6 illustrates the centralized switch control of the NCC. 7. The NCC centrally collects all MDR data from all tandem node switches and records the data on magnetic tape for off-line processing. This avoids the operational costs of manual MDR tape collection. 8. The NCC provides management aids to track alarms and trouble reports, and produces summaries of MDR and traffic data. These reports help the telecommunications manager to "monitor the pulse" of network activity.

Upon completion of a call which passes through the network, each of the involved tandem node switches creates message detail record (MDR) data which identifies the called number, the incoming and outgoing trunk groups and circuit number, authorization code (if applicable), the date, beginning and completion times, and call disposition. In the case of an originating node, the station on the tandem node switch or the access line from a satellite PABX would be identified. A station on a remote PABX could also be identified if equipped with automatic identification of outward dialing (AIOD).

The collection and magnetic tape storage of message detail record (MDR) data is important to many network customers, as it allows for equitable proration of telecommunications costs and supports network traffic engineering activities. MDR data can be accessed on-line for maintenance purposes. Referring to FIG. 7, the NCC collects MDR data in an MDR database 40 from all network node switches 10 and creates a single, uniformly formatted magnetic tape 41 convenient for off-line processing. The centralized collection of MDR records avoids the problems of physical transportation of locally created MDR tapes. A single tape eases the off-line merging problems, and a single format eases the off-line pre-processing problems. In case of a data-link failure, data from a switch produced tape 42 can be entered through an MDR consolidation and reformatting module 43.

A report generation unit 45 produces an MDR summary report 49 to provide NCC operators with an overview of network traffic.

Figure 9:
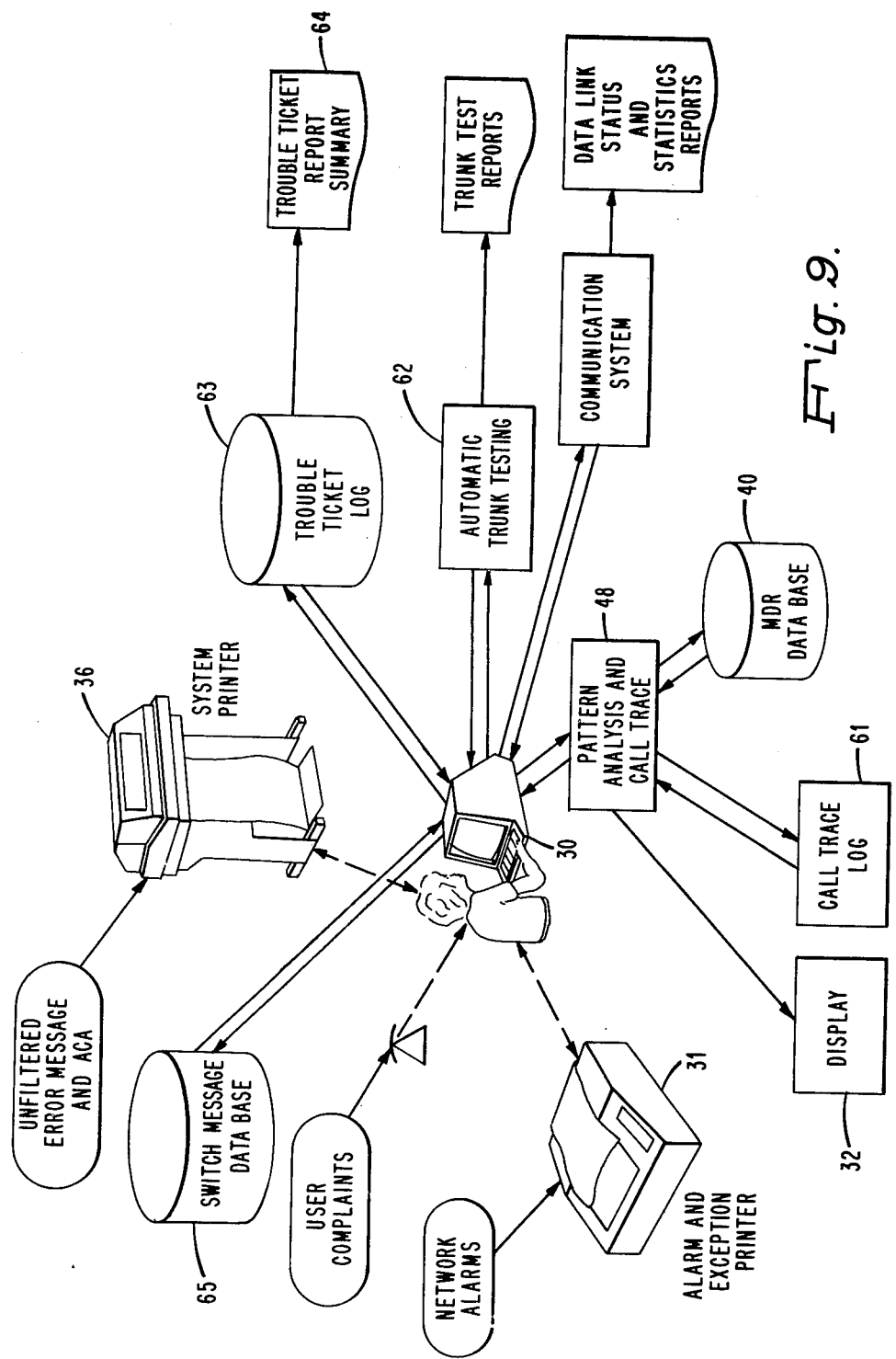
FIG. 9 illustrates the maintenance record keeping feature of the NCC.

With reference to FIG. 9, automatic circuit assurance (ACA) reports are sent by the tandem node switch 10 to the network control center, identifying trunks with either long or short holding times. These reports can also indicate trunk problems and can be used in conjunction with other NCC features to assist in localization of a problem.

The network control center makes valuable use of network user experience and complaints as a source of maintenance information. The NCC provides a call trace capability as well as database access to all past automatic circuit assurance reports and recent MDR records.

Figure 15:
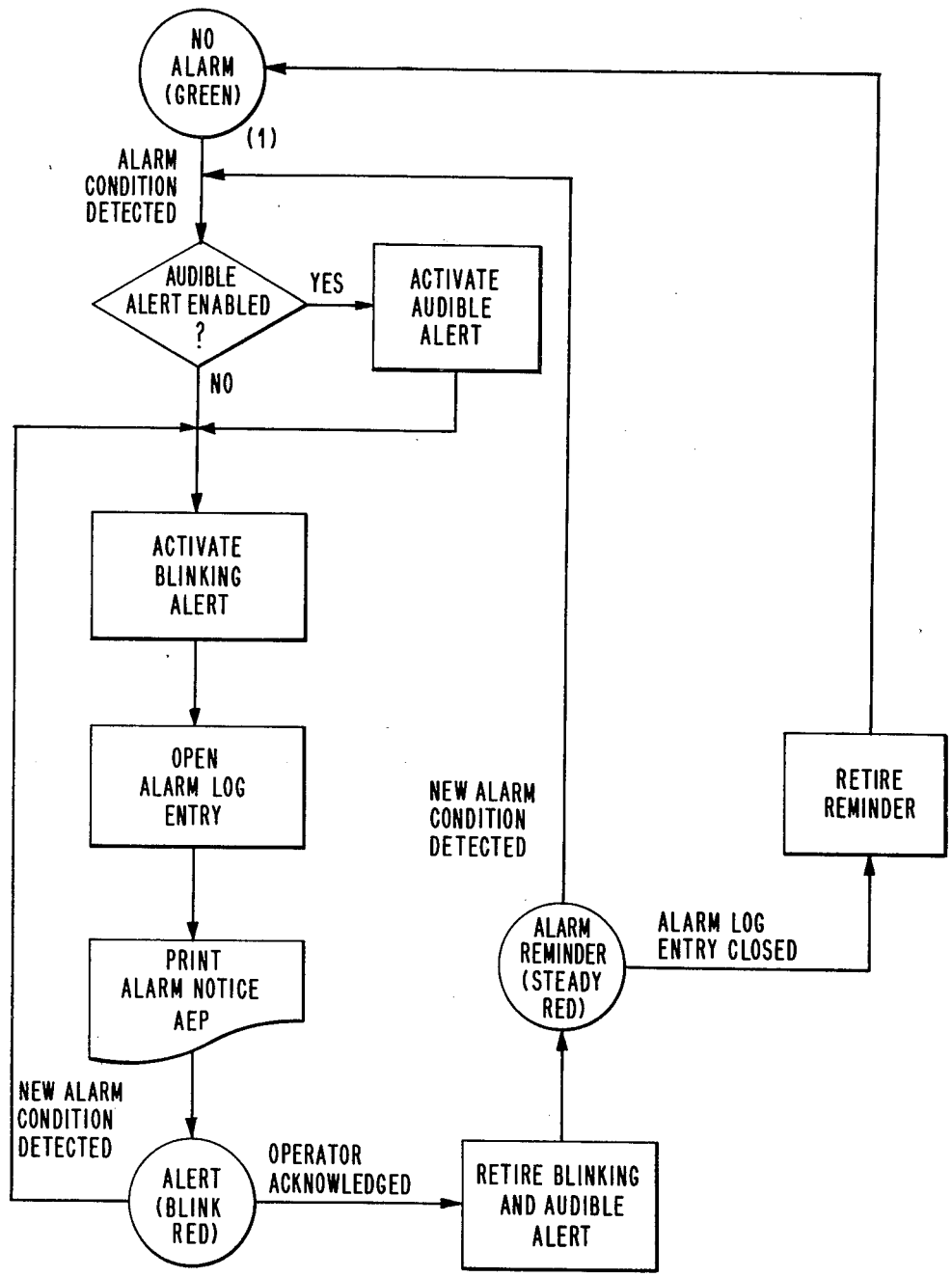
FIG. 15 is an alarm state diagram.

The NCC call trace feature would typically be used in response to a network user complaint. Complaints may result from noisy lines, insufficient volume, call cutoffs, etc. Based upon the called and calling number and the approximate time of the call, call trace will sort the MDR records and determine the exact circuit path (trunk group and circuit identification) taken by the call through any number of tandemed switches. FIG. 15 is an information flow diagram of the call trace feature. This information may be used to initiate further maintenance activity. The NCC also creates a log of all call traces and their results, which can be studies to identify facilities common to a number of complaints. The call trace log can often reveal an intermittent or subtle problem undetectable via other mechanisms.

To uncover problems not otherwise apparent, additional features allow an operator to selectively search a database of MDR records based upon time, date, switch, incoming or outgoing trunk, called or calling number, and/or call disposition. For example, a specific trunk can be examined for short holding times. Adjunct to these search/sort/select features (which can be applied to switch messages, MDR, ACA, and traffic data) is the capability of requesting printed reports of the results in operator-definable formats.

Figure 8:
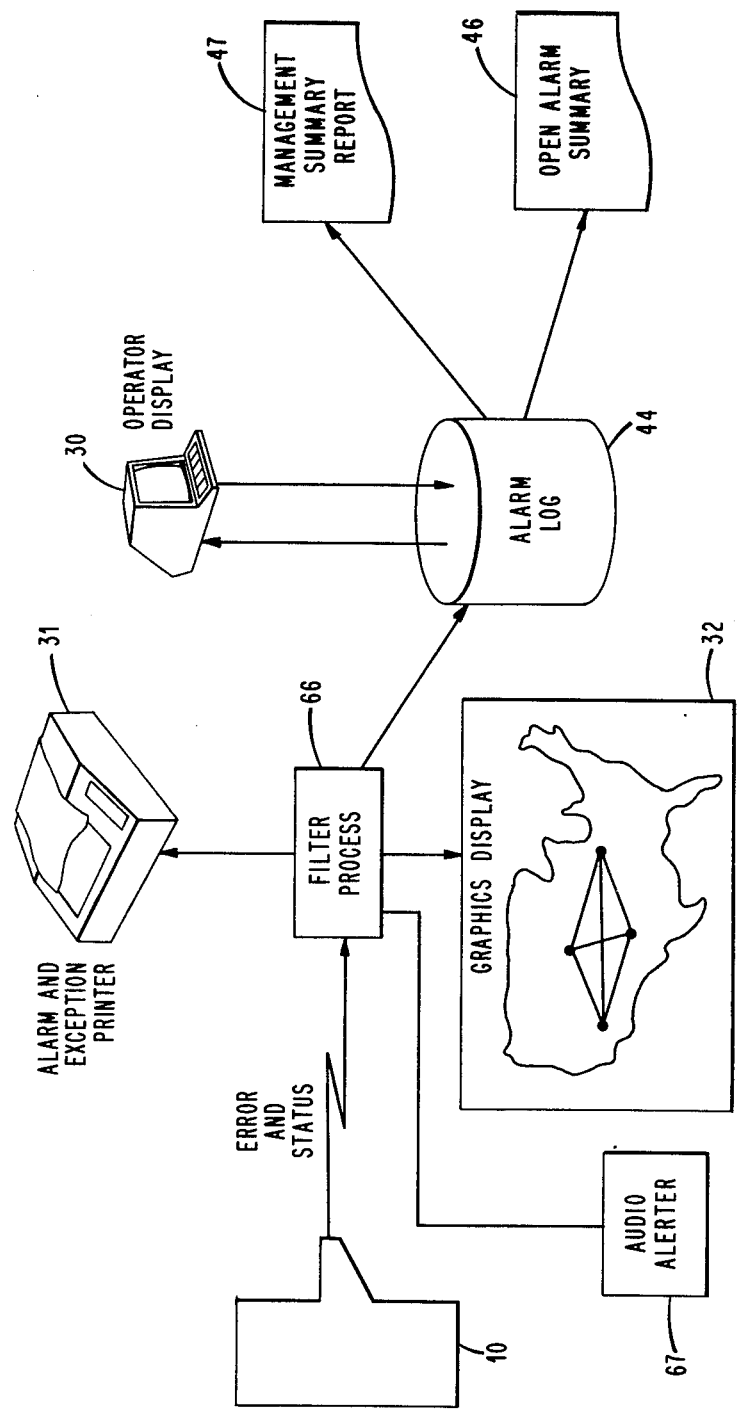
FIG. 8 diagrams the alarm detection feature of the NCC.

The network control center provides two powerful trouble tracking mechanisms: an alarm log and trouble tickets. These computerized facilities, illustrated in FIGS. 8 and 9, respectively, support the network operators and their management by simplifying and assisting in trouble followthrough. This avoids previous manual methods which were usually ad hoc and often incomplete.

In a centralized control center environment, the operator must be made aware of critical maintenance conditions rapidly. The network switches remote all maintenance information to the network control center. However, in a multiswitch network the volume of maintenance information (e.g., switch status and error messages) can be so large that critical messages get overlooked. To ensure that critical conditions are not overlooked, the NCC alarm feature identifies messages requiring immediate operator attention.

Every message from each tandem node switch in the network is transmitted by a computerized filter 66 to the NCC and compared with predefined alarm conditions. If there is a match, an alert is immediately generated and the alarm message is printed by the alarm and exception printer 31. Further, many categories of messages are not of alarm priority unless their frequency of occurrence reaches a certain threshold. This would apply, for example, to intermittent hardware or software failures. In such instances, the NCC also alerts the operator when a predefined frequency-of-occurrence threshold has been exceeded.

An alarm log 44 is a computerized database, automatically updated each time an alarm is detected by the NCC. Included in the alarm log format are the date and time of occurrence, switch identification, message type, status, alarm log entry number, and space for an operator-entered free-format text area. The operator is given wide-ranging ability to print, display or update alarm log entries at any time through the terminal 30.

To maintain visibility of alarms, there is a periodic open alarm summary report 46 which, on an operator-selected schedule, reminds him with a short summary of open alarms. Also provided is a printed management summary report 47 which, for a specified reporting period, summarizes the alarms opened and closed, and the dates and times of their opening or closing.

Analogous to the alarm tracking mechanism, the NCC provides a computerized trouble ticket log 63 to coordinate and track general troubles. The trouble ticket format, displayed upon operator request, provides a time, date and trouble ticket number field already entered by the system. In addition, there are fields for the switch identifier, the operator's name, the site telephone number, an area for trouble descriptions and a status field (open and closed). As with the alarm log, entries may be sorted by time, date, switch, trouble ticket number or status. Also provided is a printed trouble ticket summary report 64.

Both the alarm and trouble ticket management summary reports provide management with visibility and documentation of problems handled by the staff, and may be used as a gauge of switch and transmission performance.

Figure 10:
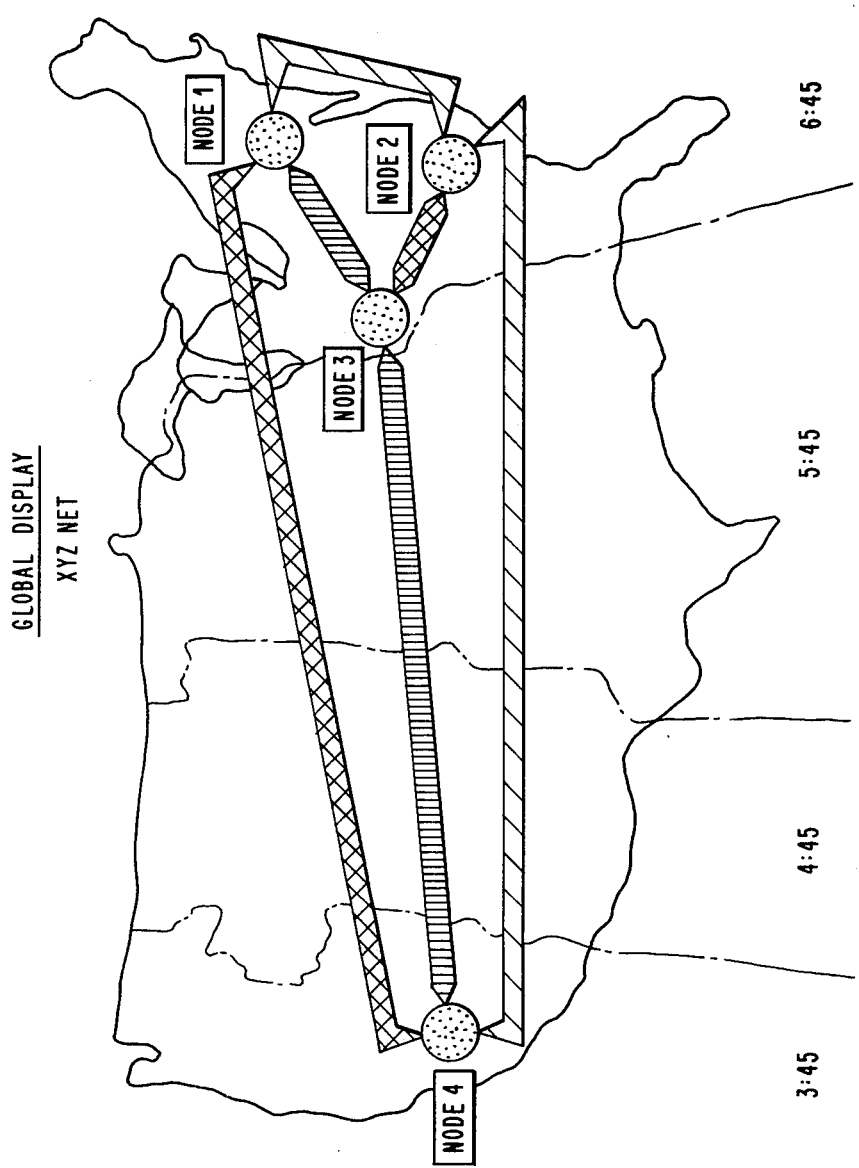
FIG. 10 is an example of a network map displayed at the NCC.
Figure 11:
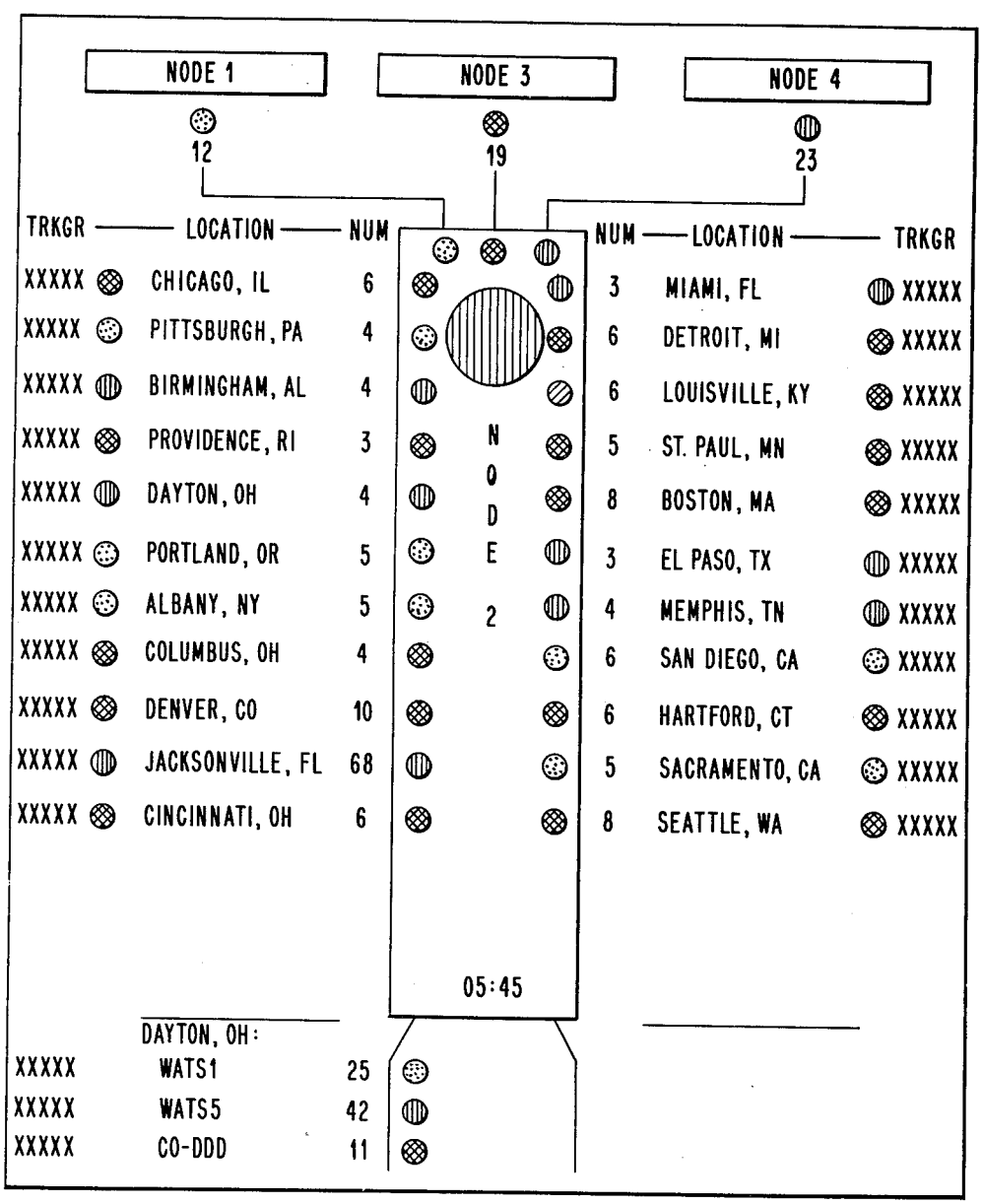
FIG. 11 is an example of a single-node format displayed by the NCC.
Figure 12:
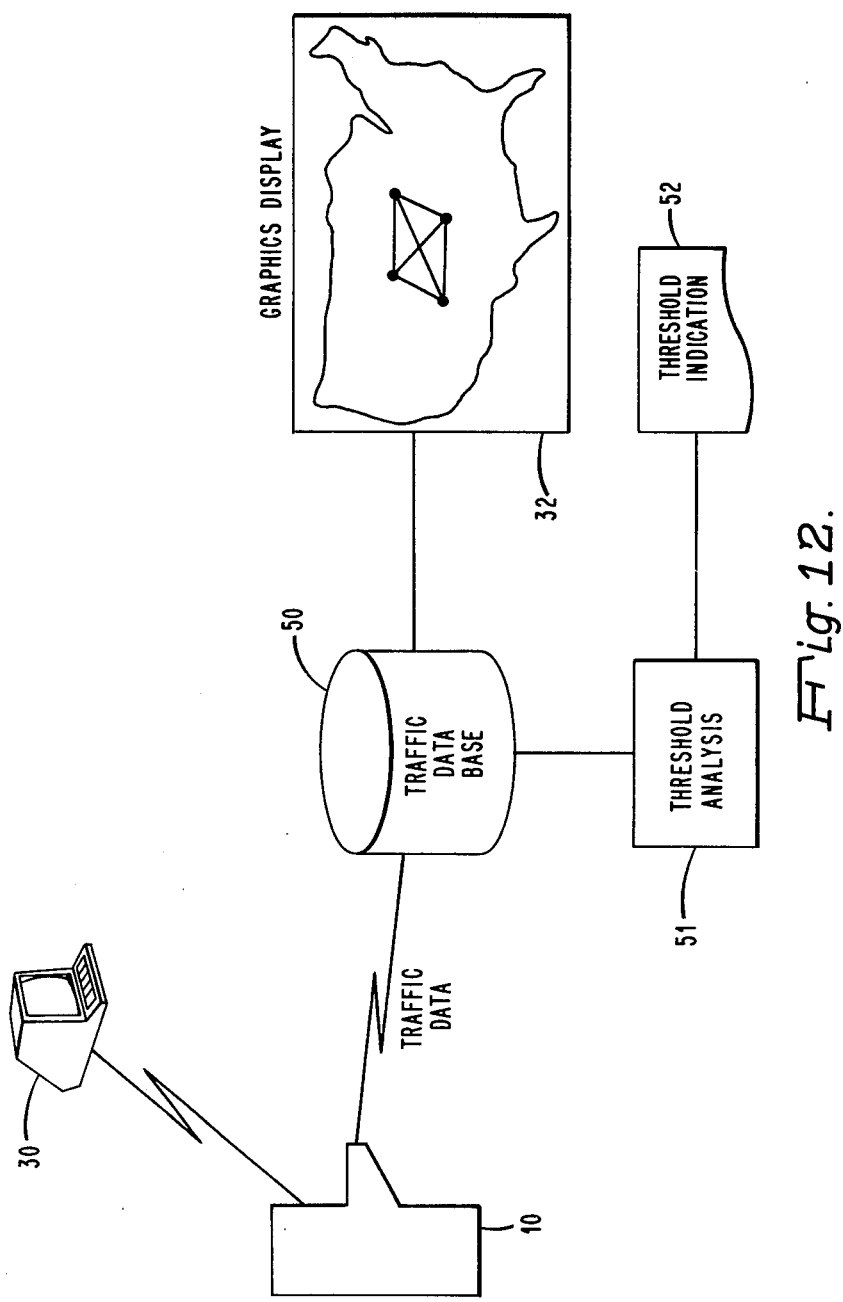
FIG. 12 is a schematic representation of the traffic monitoring feature of the NCC.

The graphics display 32 plays an integral part in monitoring and tracking both switch alarm messages and traffic conditions. The NCC operator can get a rapid overall impression of network traffic from a "global display", an example of which is illustrated by FIG. 10, or may choose instead to watch a single-node switch as illustrated by FIG. 11. The "single-node" images provide, at a glance, the alarm status at all nodes, traffic monitoring of all trunk groups connected to the node of interest, including IMTs, satellite PABX links (access lines), on-net and off-net access lines (DID, CO, FX, WATS), and other details concerning each of these trunk groups, such as number of circuits per group and vendor.

Network alarm status (and traffic) information is dynamically displayed via color graphics giving the operator an overview at a glance of current networks alarm status (and traffic conditions). This avoids the traditional deluge of rows and columns of numbers. The principal display consists of a geographic representation of all nodes and inter-machine trunks in the network. Immediate recognition of alarm conditions is assured by changing the node symbol of the affected node from green to flashing red and sounding an audible alert which can only be silenced by operator acknowledgement. The node symbol is returned to green when the corresponding alarm is retired. The actual message which triggered the alarm is printed on the alarm and exception character printer 31. This is illustrated by alarm state diagram of FIG. 15.

The general usefulness and applicability of NCC features may best be seen through example. Suppose a PABX attendant calls the NCC operator indicating that a number of users have complained of noisy lines or interrupted calls when making calls to a particular network switch. The PABX attendant provides information regarding the called and calling numbers, and the NCC operator logs the trouble indications in a trouble ticket.

A variety of trouble conditions could exist at this point: the problem may be intermittent or stable, and may exist in the transmission or switching facility. Of course, intermittent problems are the most difficult to diagnose, and that is where the NCC features become most useful. The NCC operator has a variety of options at this point.

The operator would probably first examine past trouble tickets and alarm logs to see if the problem was already detected, or whether similar reports had been logged earlier. Depending on the circumstances, the operator may choose to initiate a call trace on one or several of the complainer's calls. The call trace will identify specific switch nodes, trunk groups and circuits involved in the call setups. The results of the call trace will enter the call trace log and common facilities may be identified. If a common trunk is found, the MDR database can be sorted to see if that particular trunk has recently experienced excessive numbers of short holding times. Abnormal holding times may also be found conveniently by sorting the ACA reports in the switch message database 65. The NCC operator could also initiate a trunk test to measure noise and gain or perhaps perform a maintenance call-through on the offending trunk. One or several of these features would identify a bad trunk. If a bad trunk is found, it may be taken out of service from the NCC. In any case, any action taken would be recorded in the trouble ticket.

Under different circumstances, the NCC operator may take a different course of action. If a switch problem instead of a trunk problem were suspected, the operator could examine the switch message database 65. The operator could select and retrieve the last maintenance summary report from a specific switch, or he might choose to see all maintenance messages from that switch for the last 30 minutes. In any case, the information is conveniently displayed. The operator may then choose to initiate a switch diagnostic. Depending on the results, the operator may transfer service to a redundant unit or put a unit out of service. If the problem were very serious, the operator could even re-route traffic to avoid the problem area. Again, actions taken would be tracked using the trouble ticket.

These are only simple examples of possible NCC activities. However, it is seen that from one central location, the NCC operator can localize a reported problem, effect required diagnostics, modify the switch hardware configuration, and, most important, provide a single maintenance contact for network users and provide coordination of repair efforts. The NCC thus provides a single center with overall maintenance responsibility.

Proper and efficient handling of non-alarm messages is also important. These messages afford the operator detailed monitoring of switch node status, and can assist in diagnostics and trouble localization. All messages from all switches are maintained in an NCC switch message database. The messages are easily accessible to the operator via database utility software capable of sorting and selecting by switch, time period, and message type (every message is assigned a message code by the tandem node switch; some message types embrace broad categories of messages, while others are unique to a single message format). This powerful database capability is a significant improvement compared to approaches which involve manually scanning reams of printouts documenting the events at each switch from past hours or days. The chances of overlooking important symptoms are drastically reduced, and operator efficiency in correlating diverse events is greatly enhanced.

Continual traffic monitoring is necessary to ensure optimal traffic handling, especially during unusual conditions. The NCC gives the network operator timely traffic information and effective congestion relief tools. Traffic monitoring and control capabilities are particularly important in a private network, where economics dictate minimal trunk group sizings. In such finely optimized networks, localized problems can have network-wide consequences. For example, should a common carrier experience a broadband failure, all trunks in an intermediate trunk group between two switches may be disabled. The NCC operator would be rapidly alerted. The operator could temporarily cancel alternate routing from distant nodes which might normally be routed through the affected switches. This prevents distant traffic from entering the affected region and being blocked when it may have had other alternate routing possibilities (such as off-net routing). This mitigates the effect of a localized problem on network-wide traffic. Further, by preventing distant traffic from entering the affected region, local users have a greater opportunity for any remaining alternate paths.

Figure 13:
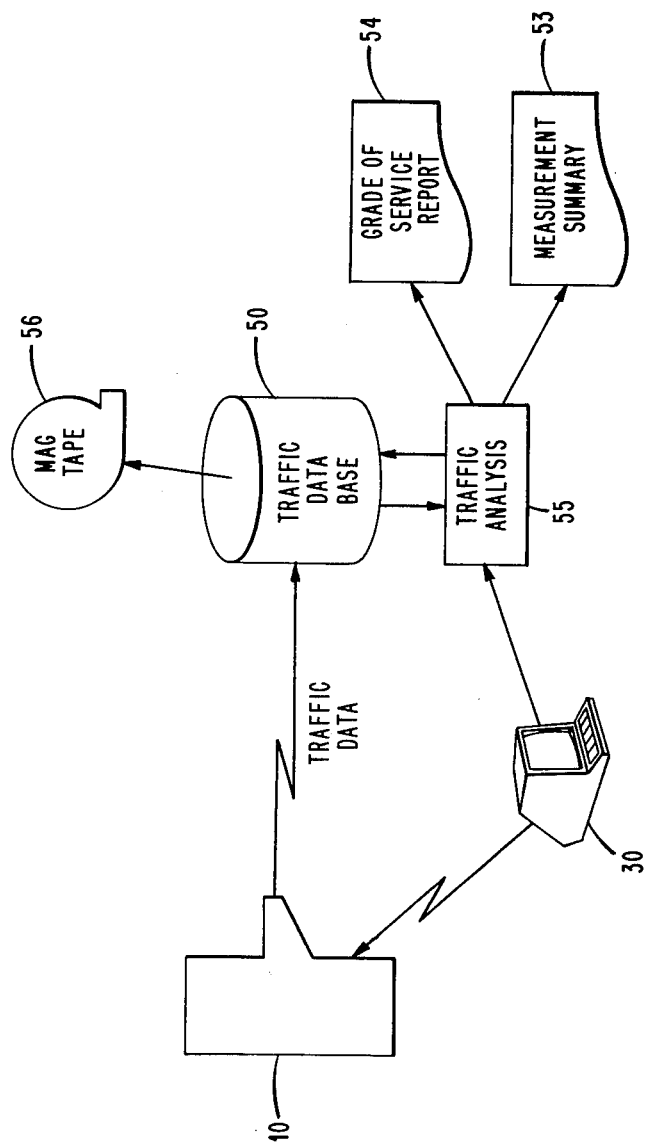
FIG. 13 is a schematic representation of the traffic analysis feature of the NCC.
Figure 14:
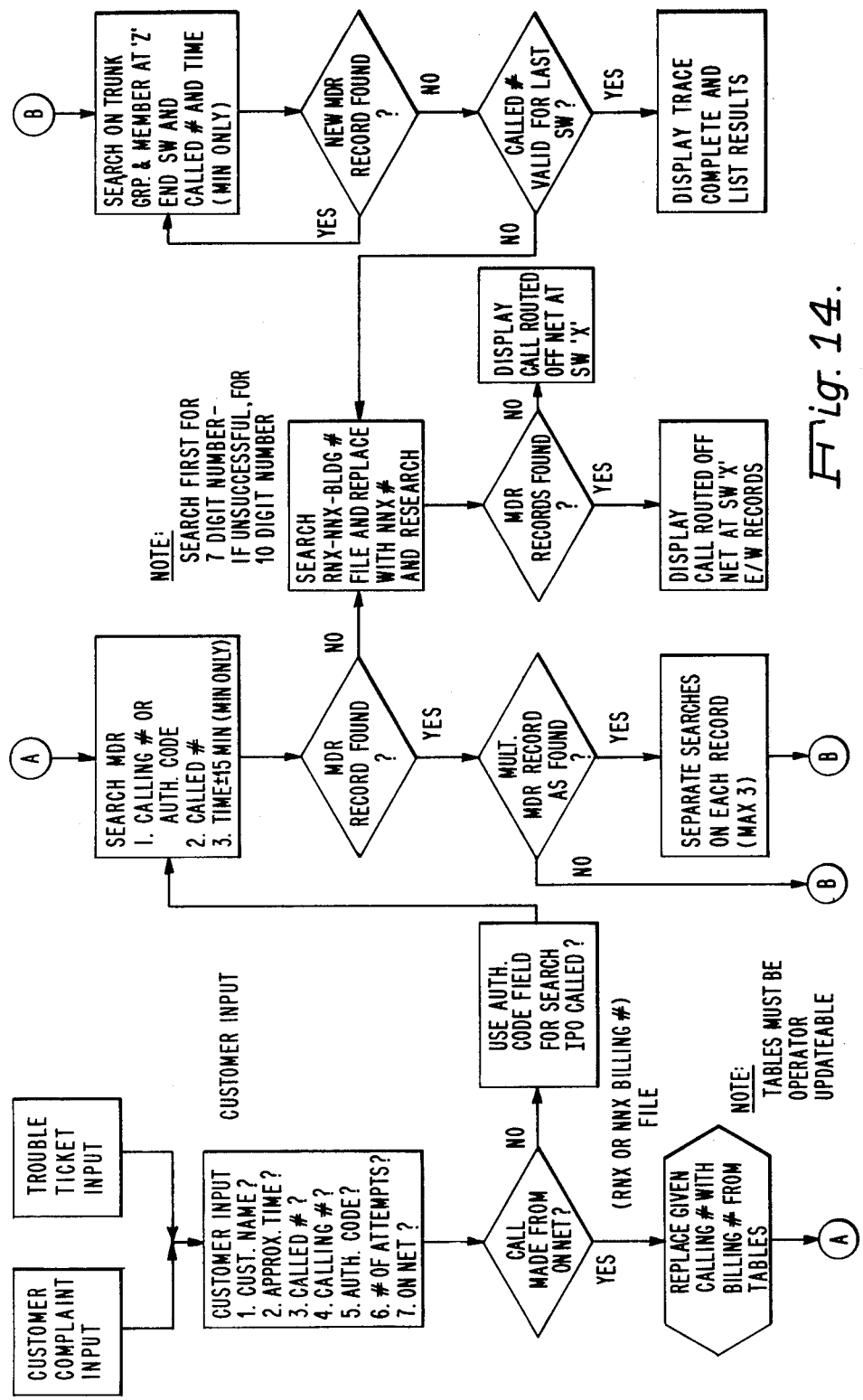
FIG. 14 is an information flow diagram for the call trace feature of the NCC.

The network control center monitors the traffic from each trunk group in the network on a near real-time basis. Referring now to FIG. 13, this is accomplished by each of the tandem node switch network switches sending "100-second scan" trunk usage information to the NCC. Specifically, the tandem node switches sample each trunk group and send information on the number of busy trunks to the NCC every 100 seconds. The information is stored in a traffic database 50 and processed by a threshold analysis unit 51.

The 100-second scan information immediately updates graphics displays. Specifically, inter-machine trunk group occupancy is shown on the "global" display (FIG. 10), and satellite PABX access line group occupancy and off-net line group occupancy are shown on a "single node" display (FIG. 11) available for each node. Colors are used to signify the level of trunk group occupancy in three arbitrary ranges; e.g., no traffic to moderate traffic (approximately 0–75% busy), heavy traffic (approximately 75–95% busy), and all-trunks-busy (ATB =100% busy). The graphics display 32 provides the operator with a rapid impression of the overall network traffic from the global display and traffic at particular nodes from the single-node displays.

Typically, all-trunks-busy (ATB) conditions are not considered anomalous until they persist for several consecutive 100-second scan intervals. Although the operator could visually monitor such circumstances on the graphics displays, this would be burdensome. Thus, a traffic threshold report 52 is printed which identifies trunk groups with more than a specified number of consecutive ATB 100-second scans to advise the NCC operator of significant ATB conditions.

The NCC operator is in a unique position: first, to decide if congestion relief action is warranted, and second, to take effective action when appropriate. Along with the traffic displays and threshold reports, the NCC operator also has other information which could bear on a potential traffic problem, such as maintenance status (both switch and trunk) and administrative information. If the operator decides to take action, available traffic control measures include:

1. Routing and translation table modification
2. Time-of-day routing
3. Alternate route controls
4. Route reservation controls
5. Code blocking
6. Queue control
7. Short register timing The operator can watch the results of the action taken on the graphics display 32. The graphics display system plays an integral part in monitoring and tracking both switch alarm messages and traffic conditions. The NCC operator can get a rapid overall impression of network traffic from the "global display", or may choose instead to watch a single node switch. The "single node" images provide at a glance the alarm status at all nodes, traffic monitoring of all trunk groups connected to the node of interest including IMTs, satellite PABX links (access lines), on-net and off-net access lines (DID, CO, FX, WATS), and other details concerning each of these trunk groups, such as number of circuits per group and vendor.

Network traffic engineering for optimum service at minimum cost requires considerable traffic data and sophisticated analysis. In most private networks, transmission facility costs dominate overall network costs. This makes providing the desired grade-of-service with the fewest trunks an important goal to the telecommunications manager. The first step toward this goal is to properly engineer the overall network; that is, to choose the proper number and location of network nodes, and properly dimension the interconnecting trunk groups, the satellite PABX trunk groups, off-net trunk groups, etc. Once the network is in place, initial traffic measurements are necessary to verify that the specified grade-of-service on each trunk group is achieved with minimum trunking. Following the initial traffic verification period, a plan of regular traffic measurements and trunk adjustments is required to accommodate changes in traffic patterns arising from network growth and other causes.

Referring to FIG. 13, the network control center provides a monthly grade-of-service report 54 which compares measured traffic statistics with the network design objectives for each trunk group, and makes a recommendation based on standard traffic engineering formulas of the number of circuits to add or remove to bring the group within objectives.

This report is derived by a traffic analysis unit 55 from traffic data routinely collected from all node switches. The traffic analysis unit 55 extracts trunk usage (in CCS) and event counts data from which busy-hour statistics are compiled and compared with the trunk-group design objectives. The trunk-group objectives are specified on a per-trunk-group basis and can be modified as appropriate. The busy-hour data and recommendations are made available at the end of each calendar month, along with the previous two months' recommendations. FIG. 16 is an information flow chart for this function.

To support off-line traffic data analysis, a traffic data tape 56 is also created at the NCC. The tandem node switch has an extensive repertoire of traffic-metering packages, including trunk usage and events (as mentioned), switch usage and events, load balancing, business service usage and events, load service indicators, inlet usage, customer service, MDR studies, and daily totals. These traffic packages can be initiated manually or scheduled on a periodic basis as measurement summary 57. In either case, the results of all traffic measurements are sent to the NCC, stored in the NCC database, made available to the operator, and placed on a traffic data magnetic tape for off-line processing.

The foregoing sections have been an overview of the telecommunication network including both the tandem node switches and the network control center. Some understanding of the system and its main components is necessary to appreciate the present invention which will now be described in more detail.

III. Traffic Analysis

The objective in traffic engineering is to provide maximum call completions with the minimum number of circuits. To reach this objective, the NCC regularly evaluates the traffic data, and by using standard traffic equations and predetermined blocking and delay targets, decides upon changes in the number of circuits required. This is a complex process and is in the past was usually done manually quarterly or annually. As a feature of the invention, the NCC automatically provides a monthly summary report of the traffic data for the network (by trunk group), performs the calculations required, and makes recommendations as to additions or deletions of circuits necessary to maintain an optimum size (and optimum cost) network.

Traffic data in the form of traffic data administration (TDA) packages is collected by the tandem node switches and transmitted to the traffic database within the NCC as seen in FIG. 13. All metering package data received at the NCC is maintained in detail on a disk for at least 24 hours in forms suitable for useful access, and are stored on the traffic data magnetic tape. Each tandem node switch generates several measurement TDA packages pertaining to traffic volume, its distribution on each route and circuit group and its variation daily, weekly and seasonally. Only the trunk measurement package (MPTK) is used by the NCC to calculate the traffic management report and recommendations pertaining to addition or subtraction of trunks.

An event counter is associated with each trunk group. A trunk group is the group of trunk circuits connecting one node to another. The event counter is incremented each time the particular event occurrence is detected (e.g., when all the trunks are busy). The event counter accumulates the event occurrences over a specific time interval. At the end of the time interval, the value representing the total event occurrences is recorded, and the event counter is reset to zero. This data is used to calculate the busy hour.

At least one resource usage counter is associated with each trunk group. Trunk group usage is the total time that a trunk group is used to perform its designated function over a specific time interval. Actual usage is not recorded in the system. By sampling at regular intervals, an approximate value for the usage of the trunk group is obtained. The technique of sampling requires a busy counter and an accumulator. When an item from a particular trunk group is allocated for use, the busy counter is incremented. When one of the resource items is released from use, the counter is decremented. At regular periods during the time interval, the value of the busy counter is added to the accumulator. At the end of the specified time interval, the value of the accumulator is recorded and reset to zero.

All usage measurements are reported in hundred call seconds (CCS), where the following conditions apply: (a) 1 CCS=1 resource member in use for 100 seconds; and (b) 36 CCS=1 Erlang. The normal sampling period is 100 seconds for trunk groups.

The degree of usage increases as the usage value increases. A maximum of 100 percent usage occurs when all trunks of a group are in use for the entire time interval. The actual numeric value for 100 percent usage depends upon the number of circuits contained by the trunk group.

Average usage of a trunk group during a traffic data administration (TDA) reporting interval (RI) is derived by using the following formula: Percent average usage=(trunk group usage÷usage for 100 percent usage)×100.

Traffic data is held in two distinct forms: intermediate data and complete data. The data is accumulated in the intermediate data area with the least amount of data processing time required for each data item. At the end of each reporting interval (RI), the package is activated and intermediate data is transferred to the complete data area in preparation for recording the complete data. The intermediate data area for each package is then reset to zero to collect data for the next RI.

The several traffic data administration (TDA) packages must be individually activated after which they will generate data messages to the NCC according to operator defined schedules until deactivated. Scheduling options allow operator selection for each metering package of:

i. Designated days: Any or all of the 7 days of the week. Typical: Monday through Friday.

ii. Collection interval (CI): Except for the daily totals metering package (MPDT) whose CI is always 24 hours, any metering package may have up to three scheduled data CIs within a 24 hour period. Data may be collected over any one, two, or three non-overlapping CIs such that the sum is equal to or less than 24 hours. Each CI must be a multiple of the Recording Interval. Typical: One CI: 7 AM to 6 PM.

iii. Reporting interval (RI): This is the time between scheduled outputs to the NCC. The RI must be a minimum of 15 minutes and may be greater in increments of 15 minutes. The RIs for all metering packages, except for daily totals, are alike for a given switch.

The MPTK package provides the following measurements for each internode trunk group.

i. INC USAGE—Incoming traffic usage (CCS) during the RI.

ii. INC ATT—Incoming attempts count during the RI.

iii. INC HITS—Incoming hits count during the RI, i.e., the total number of calling party disconnects before the receipt of digits.

iv. OGT USAGE—Outgoing traffic usage (CCS) during the RI.

v. OGT ATT—Outgoing attempts count during the RI.

vi. OGT OFL—Outgoing overflow count during the RI.

vii. Q ATT—Attempts count on indicated queue during the RI.

viii. Q OFL—Overflow count on indicated queue during the RI.

ix. Q USAGE—Usage (CCS) of the indicated queue during the RI.

x. OHQ ABAND—Off-hook queue abandon count during the RI.

xi. RBQ ABAND—Ring-back queue abandon count during the RI.

xii. OHQ TIMEOUT—Off-hook queue timeout count during the RI.

Thus, a switch provides per-circuit traffic data and per-queue group data.

Regarding items i through vi: For one-way trunks, only the appropriate three measurements are relevant. Traffic grade-of-service analysis can only be meaningful for outgoing service, although the incoming usage on a two-way trunk is considered part of the carried traffic load.

The MPTK package provides items i, ii, iv, and v on a per trunk group member basis for one trunk group in the system.

The NCC operator is able to activate this package as desired, in which case the resulting data is stored on the traffic tape.

The incoming and outgoing usages for two-way trunk groups used is the same in MPTK. Two busy counters for each trunk group may be used to calculate the incoming and outgoing usages separately.

The traffic measurement summary report 57 is intended to supplement overall network engineering by providing traffic measurement summaries on an individual trunk group basis. No attempt is made to correlate whole network traffic patterns as the traffic data magnetic tape 56 is created for that purpose.

The traffic measurement report 57 is designed for printing on a monthly basis at operator request up to 10 days after the end of the reporting period (RP) requested.

All measurement data for the traffic measurement reports are obtained from the MPTK metering package. FIG. 16 is an information flow diagram of the steps taken to calculate recommendations. First, the MPTK is read and data days are selected. The average busy hour is found and other report fields are calculated. Then the recommendations are computed using a standard blocking formula. In most cases the data required to calculate a given monthly (or intermediate) report field can be saved as an accumulated sum, thus eliminating the necessity to store vast quantities of detailed data items. In addition, the number of trunks in each group, the starting times of the busy hours defined above, and the results for the preceding two months of the computations for "TIMES ABOVE TARGET" and "ADD/RMV TRUNKS TO MEET TARGET" are printed. An example of a traffic measurement report format is seen in FIG. 17.

The report layout shows the report title and date of printing on the first line, then the report page number, then the switch number and the reporting period, then column headings and report data. TRK GRP identifies the trunk group. NUM TKS is the number of trunks in the trunk group.

For trunk groups with queues, a line showing queue data follows the regular traffic measurement data line and be designated by "QUE" in the TRK GRP field.

The remaining report fields are specified in following sections.

To eliminate averaging-in data from abnormally low traffic days, e.g., holidays, a data day is defined as a designated day for which the average usage of a selected set of trunk groups (e.g., IMTs) exceeds a specified threshold.

It is necessary to accumulate all of the various MPTK raw data items (marked with an * in the following description), and to also accumulate the daily computed offered load, blocking, and average queue delay for each hour of interest (by switch local time). However, once the busy hour is identified after the end of the RP, only the accumulations for the busy hour are used in subsequent calculations.

The "time consistent" busy hour is determined for each trunk group. This may be accomplished by accumulating the computed offered load for each data day for each hour, and picking the hour with the greatest accumulated total (or highest average offered load) for the reporting period.

The two-way offered load for a given day and hour is given by:

$$\text{Offered Load} = \text{Carried Load}/(1-\text{Blocking}) \quad (1)$$

where, $$\text{Carried Load} = \text{INC USAGE}^* + \text{OGT USAGE}^* \quad (2)$$

and, $$\text{Blocking} = \text{OGT OFL}^*/\text{OGT ATT}^* \quad (3)$$

For one-way trunk groups, only the appropriate term is used in (2).

The average offered load for a given hour is then given by:

$$\text{avg[Offered Load]} = \frac{\sum_{}^{n \text{ Data Days}} \text{Offered Load}}{n} \quad (4)$$

Doing this computation for the busy hour gives the AVG BSY HR OFFERED LOAD to be printed in the report (field 7).

The accumulated sums of busy hour INC USAGE* and OGT USAGE* data over the n data days of the reporting period divided by n give the averages to be printed in field 4 (INC) and field 5 (OUT) respectively. The carried load (CAR'D LOAD) in field 6 is then just the sum of fields 4 and 5. (Field 7 OFR'D LOAD was covered in the preceding section.)

OUTGOING ATMPS (field 8) and OVFL (field 9) are computed in similar fashion to average usages by averaging busy hour OGT ATT* and OGT OFL* data over the data days in the reporting period.

Busy hour average blocking (field 10) is given by:

$$\text{AVG BLKG} = 1 - \frac{\text{CAR'D LOAD}}{\text{OFR'D LOAD}} \quad (5)$$

QUEUE ATMPS, OVFL, USAGE, ABND, and TMOTS (fields 11 through 16) are averages over the data days in the reporting period (RP) of busy hour data items Q ATT*, Q OFL*, Q USAGE*, OHQ ABAND*+RBQ ABAND* and OHQ TIMEOUT* respectively. Once again, accumulate and divide by n.

Average queue delay (field 17) pertains only to off-hook queuing, and is given by:

$$\text{DLY} = \frac{\sum_{}^{n \text{ Data Days}} \frac{Q \text{ USAGE}^* \times 100}{Q \text{ ATT}^* - \text{OHQ ABAND}^*}}{n} \quad (6)$$

The operator preselects selected busy hour average blocking target on regular report lines, or his average off-hook queue delay target on QUE lines.

How many hours during the respective RPs an unqueued trunk group has exceeded its blocking target or a queued group has exceeded its delay target is calculated. Results for the current and preceding two months are entered into the report. Since the busy hour is not known until the end of the reporting period, these two above target counters must accumulate for all hours. This means blocking and queue delay must be computed for each hour. The applicable formulae are:

$$\text{Blocking} = \frac{\text{OGT OFL}^*}{\text{OGT ATT}^*} \quad (7)$$

-continued
$$\text{Average Queue Delay} = \frac{Q \text{ USAGE}^* \times 100}{Q \text{ ATT}^* - \text{OHQ ABAND}^*} \quad (8)$$

Recommendations are made for adding or removing circuits, signified by a plus or minus sign respectively, to accommodate the target grade of service for blocking on unqueued trunk groups or delay on queued groups. Recommendations for the current and preceding two months are entered into the report.

These recommendations are computed using a standard blocking formula or a customer specified formula. The standard blocking formulae are the Erlang B Formula, the Erlang C Formula, and the Poisson Formula.

Where a is the offered load in Erlangs (1 Erlang=36 CCS) and c is the number of trunks, the probability of blocking in an infinite source system with blocked calls cleared is given by the Erlang B Formula:

$$B(c,a) = \frac{a^c}{c!} \left[ \sum_{k=0}^{c} \frac{a^k}{k!} \right]^{-1} \quad (9)$$

If blocked calls are delayed, the blocking probability (of a delay D=0) is given by the "Erlang C" Formula:

$$C(c,a) = \frac{a^c}{c!} \frac{c}{c-a} \left[ \sum_{k=0}^{c-1} \frac{a^k}{k!} + \frac{a^c}{c!} \frac{c}{c-a} \right]^{-1} \quad (10)$$

and the delay distribution by:

$$P(D\ t) = e^{-\frac{c-a}{T} t} C(c,a) \quad (11)$$

where $T = $ average holding time $= \frac{\text{USAGE} \times 100}{\text{ATMPS} - \text{OVFL}}$ from the previously calculated OUTGOING parameters of fields 5, 8, and 9.

The Poisson Formula arises from a model with blocked calls held in the system and retrials accounted for, and gives a blocking probability between the extremes of Erlang B and C. The Poisson Formula is:

$$P(c,a) = \sum_{k=c}^{inf} \frac{a^k}{k!} e^{-a} \quad (12)$$

The computer iteratively "plugs into" the specified blocking formula parameters of offered load, a, and for delay distributions, the average holding time, T, computed from the average busy hour figures, and increment or decrement the number of trunks, c, until the blocking formula yields the result nearest to but not exceeding the specified target. The recommendation is then the signed difference between this result and the actual circuits equipped.

While there has been shown and described what is at present considered the preferred embodiment of the invention, it will be obvious to those skilled in the art that various changes and modifications may be made therein without departing from the scope of the invention as defined by the appended claims.

I claim:

1. In a telecommunication network having a plurality of tandem node switches interconnected by a plurality of trunk groups, a system for mechanically generating traffic data reports and recommending additions or deletions of trunks in an unqueued trunk group necessary to maintain an optimum size network, said system comprising:
   means for reading and storing unqueued trunk group measurement packages provided by each tandem node switch;
   means for selecting as data days those days for which the average usage of a selected set of unqueued trunk groups exceeds a specified threshold;
   means for determining the average busy hour;
   means for determining the average offered load;
   means for calculating the amount of busy hour average blocking; and
   means for calculating the number of unqueued trunks to be added or deleted so that the calculated busy hour blocking is approximately equal to a target busy hour average blocking.

2. In a telecommunication network having a plurality of tandem node switches interconnected by a plurality of trunk groups, a system for mechanically generating traffic data reports and recommending additions or deletions of trunks in a queued trunk group necessary to maintain an optimum size network, said system comprising:
   means for reading and storing queued trunk group measurement packages provided by each tandem node switch;
   means for selecting as data days those days for which the average usage of a selected set of queued trunk groups exceeds a specified threshold;
   means for determining the average busy hour;
   means for determining the average offered load;
   means for calculating the average holding time; and
   means for calculating the number of trunks to be added or deleted so that the calculated queue delay is approximately equal to a target average queue delay.

3. In a telecommunication network having a plurality of tandem node switches interconnected by a plurality of trunk groups, a system for mechanically generating traffic data reports and recommending additions or deletions of trunks in a queued or unqueued trunk group necessary to maintain an optimum size network, said system comprising:
   means for reading and storing trunk group measurement packages provided by each tandem node switch;
   means for selecting as data days those days for which the average usage of a selected set of trunk groups exceeds a specified threshold;
   means for determining the average busy hour;
   means for determining the average offered load;
   means for calculating the amount of busy hour average blocking of unqueued trunk groups;
   means for calculating the number of trunks to be added to or deleted from an unqueued trunk group so that the calculated busy hour blocking is approximately equal to a target busy hour average blocking;
   means for calculating the average holding time for a queued trunk group; and
   means for calculating the number of trunks to be added to or deleted from a queued trunk group so that the calculated queue delay is approximately equal to a target average queue delay.

* * * * *